Figure 1:
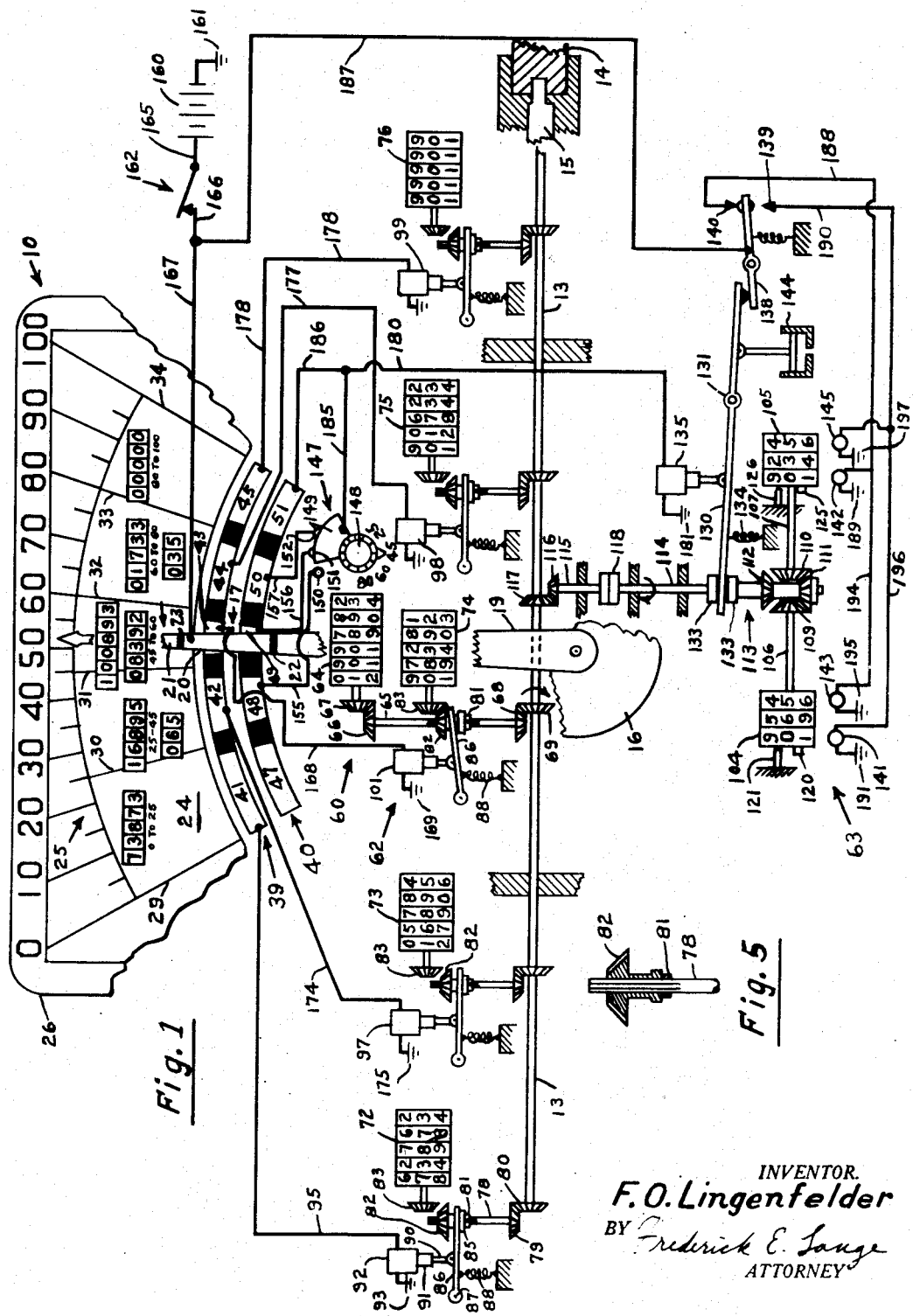

Nov. 28, 1950      F. O. LINGENFELDER      2,531,448
DISTANCE REGISTERING DEVICE
Filed May 14, 1946      2 Sheets-Sheet 2
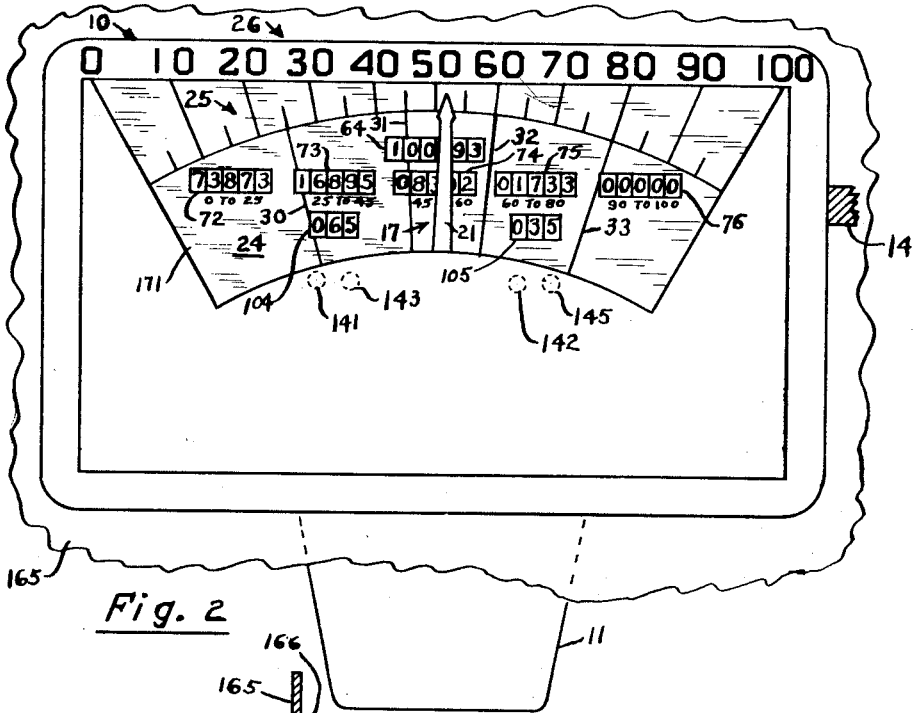
Fig. 2
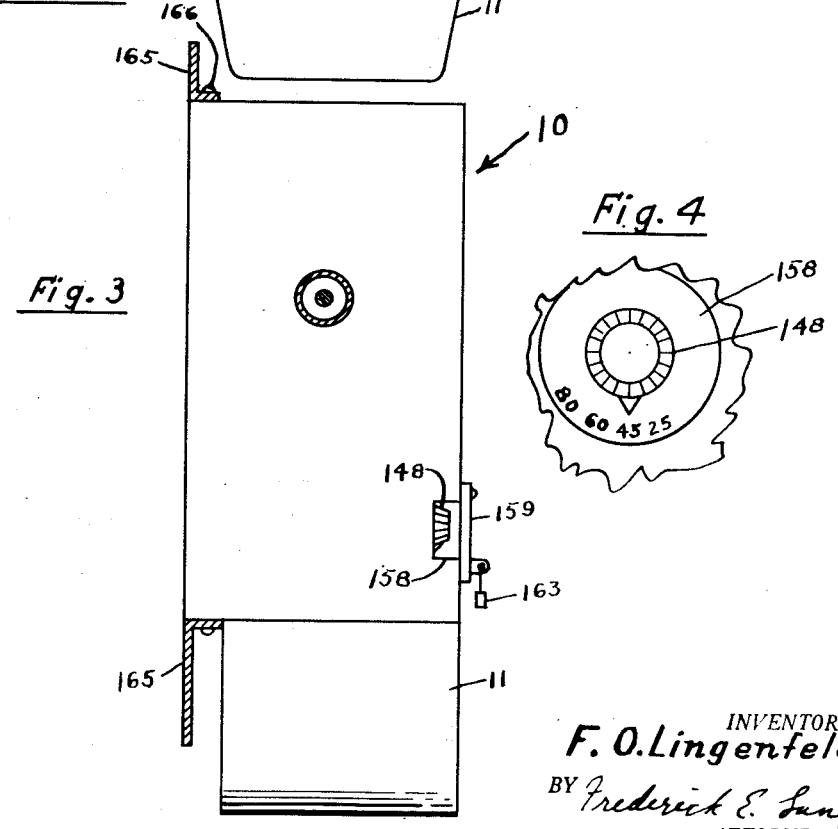
Fig. 3
Fig. 4
INVENTOR.
F. O. Lingenfelder
BY Frederick E. Lange
ATTORNEY Patented Nov. 28, 1950

2,531,448

UNITED STATES PATENT OFFICE 2,531,448

DISTANCE REGISTERING DEVICE

Frederick O. Lingenfelder, Lincoln, Nebr.

Application May 14, 1946, Serial No. 669,472

5 Claims. (Cl. 235—95)

The present invention relates to distance registering devices and more particularly to odometers.

An object of the present invention is to provide a distance registering device for registering the distances a vehicle has travelled within anyone of various speed ranges.

A further object of the present invention is to provide a device having a plurality of distance registering devices for registering the distances a vehicle has travelled within each of a number of speed ranges and a further distance registering device for registering the total distance a vehicle has travelled.

A still further object of the present invention is to provide a device for registering the speed and distance travelled by a vehicle and which includes means responsive to the movement of a vehicle for positioning a speedometer and for selectively operating one of a plurality of odometers dependent upon the speed range indicated by the speedometer.

A still further object of the present invention is to provide a device such as set out in the preceding object in which means positioned by the speedometer selectively control the connections between a device responsive to the movement of the vehicle and a plurality of odometers.

A still further object of the invention is to provide a device having a plurality of distance registering devices which collectively indicate a predetermined distance and which individually indicate the distances within said predetermined distance travelled in each of several speed ranges.

A further object of the invention is to provide an improved device to indicate the speed range within which a vehicle has last been driven.

A further object is to provide lights which are selectively illuminated in accordance with the speed at which the vehicle has most recently been driven for an appreciable period of time.

Other objects of the invention will be apparent from a consideration of the accompanying specification, claims, and drawing of which Figure 1 is a schematic view of my improved odometer arrangement associated with a speedometer of conventional construction, Figure 2 is a front elevation view of my improved odometer and speedometer, Figure 3 is a side elevation view of my improved device, Figure 4 is a fragmentary view of the same, and Figure 5 is a sectional view of a detail thereof.

Referring to the drawing, the numeral 10 is employed to designate a speedometer housing best shown in its entirety in Figures 2 and 3. As shown in those two figures, the housing is generally rectangular in vertical cross-section, with the exception of a depending portion 11. Located within the housing 10 is a shaft 13 (Figure 1) which is driven by a flexible driving shaft 14 connected to shaft 13 by means of a connector 15, the details of which are not shown. The driving shaft 14 is connected in the usual manner to the transmission of the vehicle or to some other suitable point of the driving mechanism of the vehicle. The shaft 13 is connected through means not shown with a magnet cooperating with a drag element 16 fragmentarily shown in Figure 1. Both the magnet and drag element are located in the dependent portion 11. The drag element is associated with the needle 17 of the magnetic speedometer. The action and construction of the speedometer are entirely conventional and it is considered unnecessary to show the details of the magnetic means for driving needle 17 in accordance with the speed of rotation of shaft 13.

The needle 17 is composed of a main portion 19 secured to the drag element 16, a conductive brush portion 20 secured to the main portion 19, and a pointer portion 21. The brush portion 20 is insulated from the main portion at 22 and from the pointer portion at 23. The pointer portion 21 moves over a dial 24 having a circular scale 25 with indicia lines running to numerals 26 indicating the speed of the vehicle. It will be noted that these numerals 26 indicate the speed in increments of 10 miles an hour from zero to 100 miles an hour. Intermediate indicia lines indicate intermediate speeds.

The dial 24 is provided with a plurality of further indicia lines 29, 30, 31, 32, 33, and 34 which are employed to divide the dial into five speed ranges. Lines 29 and 30 define a speed range of 0 to 25 miles an hour, lines 30 and 31 a speed range of 25 to 45 miles an hour, lines 31 and 32 a speed range of 45 to 60 miles an hour, lines 32 and 33 a speed range of 60 to 80 miles an hour, and lines 33 and 34 a speed range of 80 to 100 miles an hour.

The conductive brush portion 20 of the indicator arm 17 moves in conductive sliding engagement with two circular contact bars 39 and 40. These contact bars 39 and 40 are each divided into a plurality of arcuate portions corresponding in arcuate length to the spacing between the various lines 29 to 34 and insulated from each other. In other words, each contact bar is divided into a number of sections corresponding to the speed ranges indicated by lines 29 to 34. For convenience in referring to them, the sections of contact bar 39 are indicated by reference numerals 41, 42, 43, 44, and 45, while the sections of the contact bar 40 are indicated by the reference numerals 47, 48, 49, 50, and 51. In the position shown, the speed of the vehicle is approximately 52 miles an hour so that the speed is within the range of 45 to 60 miles an hour. The connective portion 20 of arm 17 is thus in engagement with sections 43 and 49 of contact bars 39 and 40. As will be explained later, the conductive portion 20 in moving over the contact bars 39 and 40 causes the shaft 13 to be selectively connected to various odometers in accordance with the speed at which the vehicle is travelling.

My apparatus comprises an odometer 64 and two further groups 62 and 63 of odometers. All of these odometers are of conventional form, each odometer consisting of a plurality of dials carrying numerals extending from 1 to 10. The wheel carrying the numerals of lowest order is directly driven and upon making one complete revolution, advances the next wheel the distance of one numeral. Thus, each wheel is moved ahead the space of one numeral upon a complete rotation of the wheel immediately preceding in descending order.

The odometer 64 is permanently connected to shaft 13 through a shaft 65 and bevelled gears 66, 67, 68, and 69. The bevelled gears 66 and 68 are secured to opposite ends of shaft 65. Bevelled gear 69 cooperates with bevelled gear 67 secured to the shaft of odometer 64. The bevelled gear 68 meshes with bevelled gear 69 carried by the shaft 13. The odometer 64 is thus continuously driven whenever the vehicle is in movement and registers the total mileage of the vehicle. Thus, the odometer 64 functions in the same manner as the usual odometer unit employed in an automobile.

The set 62 of odometers consists of five odometers 72, 73, 74, 75, and 76. It will be noted that there is one of these odometers for each of the five speed ranges designated by lines 29 to 34. Means is provided in connection with each of the odometers for selectively connecting it in driven relation with the main shaft 13. In the case of odometer 72, a shaft 78 carries at its lower end a bevelled gear 79 which meshes with a bevelled gear 80 so that shaft 78 is continuously driven by shaft 13. Slideably secured to shaft 78 is a sleeve 81. The sleeve 81 is splined to shaft 78 so as to be driven thereby, as best shown in Figure 5. A bevelled gear 82 is carried by sleeve 81 and is adapted to be moved, upon upward movement of sleeve 81, into engagement with bevelled gear 83 secured to the driving shaft of odometer 72. The sleeve 81 also carries a collar 85. Cooperating with the sleeve 81 is an arm 86 pivoted at its lefthand end at 87. The opposite end of arm 86 is forked and surrounds sleeve 81 between gear 82 and collar 85. A spring 88 biases the arm 86 and hence sleeve 81 downwardly to a position in which gear 82 carried by sleeve 81 is out of engagement with gear 83. Also secured to the arm 86 is a link 90 connected to a solenoid core 91 extending into a solenoid winding 92. One terminal of the solenoid winding is connected to ground at 93 and the other terminal is connected through a conductor 95 to the section 41 of the contact bar 39. When solenoid 92 is energized, the solenoid core 91 is drawn upwardly moving the sleeve 81 upwardly and bringing gear 82 into mesh with gear 83. This results in odometer 72 being connected in driven relation with the shaft 13.

The mechanism for selectively connecting odometers 73, 75, and 76 with shaft 13 is identical to that just described in connection with odometer 72. It is accordingly not deemed necessary to describe these driving mechanisms in detail beyond referring to the solenoids which control their operation. In the case of odometer 73, the solenoid winding is designated by the reference character 97. In the case of odometers 75 and 76, the solenoids are designated by the reference characters 98 and 99 respectively. When any one of these solenoids is energized, the associated odometer is connected in driven relation with the main shaft 13. Whenever the solenoid is deenergized, on the other hand, the associated odometer is disconnected from shaft 13 and remains unaffected by the rotation of shaft 13.

In the case of odometer 74, the sleeve 81 is carried by the shaft 65 in splined relation therewith. As with the other driving mechanisms, the sleeve carries a bevelled gear 82 adapted to mesh with the bevelled gear 83 secured on the driving shaft of the odometer. A pivoted arm 86 controls the position of sleeve 81, and this arm 86 is in turn controlled by a solenoid winding 101. As shown in the drawing, the solenoid winding 101 is energized and is effective to hold sleeve 81 in its upper position in which gears 82 and 83 are in engagement. It is understood that upon deenergization of solenoid 101, the sleeve 81 moves downwardly under the action of its associated biasing spring 88 to disengage gears 82 and 83. The engagement or disengagement of gears 82 and 83 has no effect upon gears 66 and 67 which remain continuously in engagement.

The set 63 of odometers consists of two odometers 104 and 105. Each of these odometers consists of only three numeral wheels since it is necessary to register only very small mileages, as will be pointed out later. The driving shafts 106 and 107 of odometers 104 and 105 respectively are oppositely disposed and are directed toward each other. Secured to these shafts are bevelled gears 109 and 110. These gears cooperate with oppositely disposed bevelled gears 111 and 112 secured to a sleeve 113. The sleeve 113 is splined to a shaft 114 so as to be movable in a vertical direction while remaining in driven relation with shaft 114. The shaft 114 is connected through a slip-friction clutch 118 with shaft 115 which carries, at its upper end, a bevelled gear 116 meshing with gear 117 carried by shaft 13. The slip-friction clutch 118 is designed to allow slippage between shafts 114 and 115 when the resistance to movement of shaft 114 exceeds a predetermined value. The odometers 104 and 105 are provided with stops to limit the movement of the odometer. In the case of odometer 104, a projecting lug 120 carried by the extreme lefthand wheel is adapted to engage a fixed stop 121 just as the numeral 1 of that wheel begins to appear in view, and while the wheel carrying this number is still connected to the other two wheels. Thus, the effect of the stop is to prevent further advancing movement of the odometer 104. Upon this occurring, the clutch 118 allows slippage between shafts 114 and 115 so as to prevent injury to the odometer 104. A similar lug 125 is carried on the extreme lefthand wheel of the odometer 105 and is engaged by a fixed stop 126. The lug 125 is so positioned on the lefthand wheel that when it engages stop 126, the numeral 1 of the lefthand wheel is just coming into view. This is while the lefthand wheel is still connected to the other two wheels. Again, when this occurs, the slip clutch 118 is effective to permit relative movement of shafts 114 and 115.

The position of sleeve 113 with respect to shaft 114 is controlled by a lever 130 which is pivotally mounted at 131. The extreme lefthand end of the lever is forked and surrounds the sleeve 113 between a collar 132 and a collar 133 carried by the sleeve 113. The sleeve is biased downwardly by a spring 134 secured to the arm 130. Opposing the action of the spring 134 is a solenoid 135, the core of which is connected to lever 130. When the solenoid 135 is energized, the lefthand portion of lever 130 and hence of sleeve 113 is held in their uppermost positions, shown in the drawing, in which gear 111 is in mesh with bevelled gears 109 and 110. When the solenoid 135 is de-energized, the lefthand portion of lever 130 and the sleeve 113 are in their lowermost positions in which bevelled gear 112 is in engagement with gears 109 and 110. When gear 111 is in engagement with gears 109 and 110, as shown, the odometer 105 is advanced and the odometer 104 is driven backwards. The odometers 104 and 105 are of the type which can be reversibly driven. When gear 112 is in engagement with gears 109 and 110, the odometer 104 is advanced and the odometer 105 is retracted.

The portion of lever 130 on the righthand side of the pivot point 131 engages a pivoted switchblade 138 cooperating with two opposed contacts 139 and 140 and which is biased into engagement with contact 139. The switchblade 138 and the contacts 139 and 140 control the energization of four electric lights 141, 142, 143, and 145. Lights 141 and 142 are red lights while lights 143 and 145 are green lights. Lights 141 and 143 are located adjacent odometer 104 while lights 142 and 145 are located adjacent odometer 105. Either lights 141 and 145 or lights 142 and 143 are illuminated depending upon the position of sleeve 113 and hence dependent upon which odometer is being advanced and which is retracted, as will be explained in more detail in connection with the operation.

A dashpot 144 has its piston connected to the arm 130 so as to retard the movement of the arm in either direction.

The energization of solenoid 135 is controlled by the conductive portion 20 of pointer 17 and the contact bar 40. The solenoid 135 is energized whenever the conductive portion 20 is engaging one of the sections 48, 49, 50, and 51, depending upon the position of a manually adjustable switch 147. This switch comprises a knob 148 carrying a contact blade 149 which cooperates with three contacts 150, 151, and 152. A switchblade 149 is of sufficient arcuate length to bridge all three of these contacts. The knob 148 is provided with a pointer cooperating with numerals representing various speeds. In the example shown in the drawing, the numerals are 25, 45, 60, and 80. When the pointer is adjacent the numeral 25, the contact blade is engaging all three of the contacts 150, 151, and 152. When the pointer is adjacent to numeral 45, as shown in the drawing, the contact bar 149 is bridging contacts 151 and 152. When the pointer of the knob 148 is adjacent to numeral 60, it engages only the contact 152. When the pointer is adjacent the numeral 80, the contact blade 149 is not in engagement with any of the contacts 150 to 152. The contacts 150, 151, and 152 are connected by conductors 155, 156, and 157 to conductive sections 48, 49, and 50. The switch including switch knob 148 is adapted to control the speed at which the operation of odometer 105 is initiated. In certain instances, as will be explained later, my odometer arrangement is employed for checking on the driver to see if he remained within the proper speed range. It is accordingly desirable that knob 148 be inaccessible to the driver in these cases. Consequently, as best shown in Figures 3 and 4, the knob 148 is located within a recess 158 in the rear of the housing 10. A pivoted cover 159 is disposed so as to cover the opening 158. Suitable sealing means 163 may be employed to indicate unauthorized removal of the cover 159.

A battery is indicated by the reference numeral 160. This battery is normally the regular automobile battery provided for starting, lighting, and ignition purposes. The negative terminal of this battery is connected to ground at 161. The positive terminal is connected to a switch 162 which, if desired, may be the ignition switch.

The mechanism described so far, with the exception of the battery 160 and the switch 162, is all located within the housing 10. This housing, as best shown in Figure 3, is secured within a flanged aperture in the instrument panel 165 by screws 166 or other suitable fastening means. The downwardly projecting portion 11 of the housing, which encloses the magnet and magnetic drag cup 16, is disposed behind the instrument panel. As best shown in Figure 2, the front of the housing 10 is provided with a window 171 which exposes the indicia lines 25, the speed range indicia lines 30, 31, 32, and 33, the pointer portion 21 of indicator arm 17, and the foremost row of numerals of each of the odometers 64, 72, 73, 74, 75, 76, 104, and 105. The remainder of the mechanism is concealed behind the front cover of the housing and the dial 24.

*Operation*

The various elements are shown in Figures 1 and 2 in the position which they assume when the vehicle is travelling at a speed of approximately 52 miles an hour. This speed is indicated by the position of the pointer 21 with respect to the numerals 26 and is within the speed range of 45 to 60 miles an hour. Under these conditions, assuming switch 162 to be closed, a circuit is established to the solenoid 101 as follows: from the positive terminal of battery 160 through conductor 165, switch 162, conductors 166 and 167, the brush portion 20 of indicator 17, contact segment 43, conductor 168, solenoid 101, and ground connections 169 and 161. As a result of the energization of the solenoid 101, the sleeve 81 is held upwardly by the lever 85 so that bevel gear 82 is in engagement with bevel gear 83 secured to the driving shaft of odometer 74. Since the vehicle is in motion and shaft 13 is being revolved in the direction indicated by the arrow adjacent gear 69, the odometer 74 is advanced in accordance with the movement of the vehicle. At the same time, the odometer 64, which is permanently connected to shaft 13 is also being advanced. Odometer 74 will continue to be advanced as long as the vehicle is moving within the speed range of 45 to 60 miles an hour. If the speed changes, so that for example, it lies within the speed range of 25 to 45 miles an hour, in which range the brush portion 20 of indicator arm 17 is in engagement with segment 42, the circuit traced to solenoid 101 will be interrupted. The insulation between the segments 41 to 45 is so selected in width as to be just slightly greater than the width of the conducting brush portion 20 so that whenever the brush portion moves on to one segment, it must leave a segment previously engaged by it. The interruption of the circuit to solenoid 101 results in the spring 88 associated with that solenoid being effective to move the bevel gear 82 downwardly out of engagement with bevel gear 83 and thus stopping further advancement of odometer 74.

The movement of the brush portion into engagement with segment 42 not only interrupts the circuit to solenoid 101, as explained above, but also establishes the following circuit to solenoid 97, from the positive terminal of battery 160 through conductor 165, switch 162, conductors 166 and 167, brush portion 20, segment 42, conductor 174, solenoid 97, and ground connections 175 and 161 to the negative terminal of battery 160. The energization of solenoid 97 causes the bevel gear 82 associated with it to be moved into engagement with the bevel gear 83 secured to the drive shaft of odometer 73. This will cause odometer 73 to be advanced.

Since solenoid 92 associated with odometer 72 is connected by conductor 95 to segment 41, it will be obvious that when the vehicle is travelling at a speed of 0 to 25 miles an hour so that brush portion 20 will be in engagement with segment 41, the solenoid 92 will be energized and odometer 72 will be advanced. Similarly, solenoid 98 is connected by conductor 177 to segment 44 and solenoid 99 is connected by conductor 178 to segment 45. Thus, when the vehicle is travelling at a speed of 60 to 80 miles an hour, solenoid 98 will be energized and the odometer 75 will be advanced. When the vehicle is travelling at a speed from 80 to 100 miles an hour, solenoid 99 will be energized and the odometer 76 associated with that solenoid will be the one that is operated.

It will be apparent from the above that the odometers 72, 73, 74, 75, and 76 are selectively operated depending upon the speed at which the car is driven, while odometer 64 is operated continuously whenever the vehicle is moving. Thus, the odometer 64 indicates the total mileage traversed by the vehicle while the odometers 72 to 76 indicate the mileage travelled within the various speed ranges. Thus, with the odometers in the position shown in the drawing, the vehicle has travelled 10,089.3 miles, of which 7,387.3 miles have been driven within the speed range of 0 to 25 miles an hour, 1,689.5 miles have been driven within the speed range of 25 to 45 miles an hour, 839.2 miles within the range of 45 to 60 miles an hour, and 173.3 miles within the 60 to 80 miles an hour range. The car has not been driven at any time within the 80 to 100 miles an hour range. While I have shown odometers 72 to 76 as each capable of registering a total mileage of only 9,999.9 miles, it is to be understood that where it is desired, an additional numeral wheel can be provided with each odometer to permit higher mileages to be registered.

Referring now to the odometers 104 and 105, when the brush portion 20 is in the position shown and when the switch knob 148 is also in the illustrated position, a circuit is established to solenoid 135 as follows: from the positive terminal of battery 160, conductor 165, switch 162, conductors 166 and 167, brush portion 20, segment 49, conductor 156, switch contact 151, switch blade 149, conductors 185 and 180, solenoid 135 and ground connections 181 and 161 back to the negative terminal of battery 160. The result of the energization of solenoid 135 is that lever 130 is held in the position shown against the biasing action of spring 134 so that gear 111 is held in mesh with gears 109 and 110, and bevelled gear 112 is held out of engagement with gears 109 and 110. Under these conditions, the odometer 105 is advanced and the odometer 104 is retracted.

It will be noted that the reading of odometer 104 is 6.5 miles while the reading of odometer 105 is 3.5 miles. This means that during the last 10 miles of travel, 3½ miles have been driven above 45 miles an hour while 6½ miles have been driven below 45 miles an hour. If the vehicle is driven continuously at a speed above 45 miles an hour, the odometer 104 will eventually reach the position at which shoulder 125 engages stop member 126. At this position, the speedometer will not quite register 10.0 miles. The stop is so designed to prevent further movement of the dial to the extreme left while the two previous dials are still coupled to it. Thus, when the dial to the extreme left is stopped, it is impossible to rotate the other two dials. Thereafter, neither the odometer 105 nor the odometer 104 is moved and the shaft 115 rotates without movement of shaft 114 due to the slip clutch 118. The purpose of the stop 126 and the shoulder 125 is to prevent the odometers from reading a total greater than 10 miles. If it were possible to continuously advance odometer 105 and to retract odometer 104, the odometer 104 would eventually have a reading of 99.9 miles. Since the only purpose of the two odometers is to indicate the distribution of the driving from a speed standpoint within the last 10 miles, this would be undesirable. By reason of the stop 125 and the shoulder 126, this is avoided.

While the operation of the odometers 104 and 105 has been described with the conductive portion 20 in engagement with segment 49 corresponding to a speed of 45 to 60 miles an hour, it is to be understood that with switch knob 148 in the position shown, the same operation will take place when conductive portion 20 is in engagement with either of segments 50 and 51. It will be recalled that the circuit to solenoid 135 was traced through conductor 180. The segment 50 is connected to this conductor by conductor 157, contact 152, switch blade 149, and conductor 185. The segment 51 is connected by conductor 186 to conductor 180. Thus, when the conductive portion is in engagement with segment 49, segment 50, or segment 51, a circuit is established to solenoid 135 to cause odometer 105 and odometer 104 to be retracted.

If it is desired to have the odometer 105 advanced whenever the speed is above 25 miles an hour, the switch knob 148 is moved to a position in which the pointer is adjacent the numeral 25. Under these conditions, the segment 48 is also connected to conductor 180, this connection being effected by conductor 155, contact 150, switch blade 149, and conductor 185. If, on the other hand, it is desired to have odometer 105 advanced only when the speed is above 60 miles an hour, the knob 148 is moved until its pointer is adjacent the figure 60. When this is done, the connection between segment 49 and the conductor 180 is interrupted so that the solenoid 135 is energized only when conductive portion 20 is in engagement with segment 50 or segment 51. Similarly, if it is desired to have the odometer 105 advanced only when the speed is above 80 miles an hour, then the switch knob 148 is turned until its pointer is adjacent the figure 80. In this position, the switch blade 149 is out of engagement with all three of the contacts 150, 151, and 152, and the only circuit which can be established to solenoid 135 is through segment 51 and conductors 186 and 180. It is to be understood that the knob 148 is normally adjusted to a speed beyond which it is not desired to have the vehicle exceed. This speed may be the legal speed limit. Again, in the case of a trucking concern, the speed could be the maximum speed at which the owners of the trucks wished to have the trucks driven. While the arrangement shown for purposes of illustration provides a limited number of speeds to select from, it will be appreciated that the switch 148 can be provided with a much larger number of contacts, and that the contact strip 40 can be divided into a much larger number of segments. For example, each segment might, if desired, correspond to a variation of five miles in speed.

In order to prevent an unauthorized person from changing the setting of knob 148, it is, as previously pointed out, located within a recess 158 behind a closure 159. This closure is normally held in place by a seal 163 which will show evidence of having been tampered with if the closure 159 is opened by such an unauthorized person.

Whenever the conductive member 20 moves to a position in which it is not in engagement with a segment not connected to conductor 180 (for example, segment 48 with switch 148 in the position shown in the drawing), the circuit to solenoid 135 is deenergized and the spring 134 is effective to move the sleeve 13 downwardly to a position in which bevelled gear 112 is in engagement with gears 109 and 110. At the same time, bevelled gear 111 is moved out of engagement with gears 109 and 110. This results in a reversal in the direction of the odometer shafts 106 and 107 so that odometer 104 is now advanced and odometer 105 is retracted. Thus, whenever the speed is below the speed for which the switch 148 is set, the odometer 104 is advanced while the odometer 105 is retracted. When, on the other hand, the speed is above the speed for which switch 148 is set, the odometer 105 is advanced and the odometer 104 is retracted. Thus, the total mileage indicated by the two odometers is always the same, 10 miles. As with odometer 105, a stop 120 is effective to limit advancement of odometer 104 whenever the mileage indicated by odometer 104 is approximately 10. Thereafter the clutch 118, permits continued rotation of shaft 115 without rotation of shafts 106 or 107. The lights 141, 142, 143, and 145 serve to indicate the speed range within which the vehicle was last driven. When the solenoid 135 is energized to cause advancement of odometer 105 a circuit is established to red light 142 as follows: from the battery 160 through conductor 165, switch 162, conductor 166, conductor 187, switchblade 138, contact 140, conductor 188, light 142 and ground connections 189 and 161 back to battery 160. At the same time, the green light 143 adjacent odometer 63 is energized by a circuit extending from battery 160 to conductor 188 through the path just traced and from conductor 188 through conductor 194, light 143, and ground connections 195 and 161 back to battery 160. When, on the other hand, the solenoid 135 is deenergized, a circuit is established from battery 160 through switch blade 138, contact 139, conductors 190 and 196, red light 141, and ground connections 191 and 161 to the other terminal of battery 160. Under these conditions, a circuit is also established to green light 145 which is connected to conductor 199 and through ground connections 197 and 161 to the negative terminal of battery 160. The lights 141, 142, 143, and 145 are located behind the front panel of the speedometer, lights 141 and 143 being adjacent odometer 104 and lights 142 and 145 adjacent odometer 105. Thus, the odometer which is being advanced is illuminated by a red light and that which is being retarded by a green light. The dashpot 144 is effective to prevent the switch blade 138 from immediately changing its position upon the speed being changed from a value at which solenoid 135 would normally be energized to one at which the solenoid 135 would be deenergized. The purpose of this is to insure that if the vehicle is being driven at a speed above the desired maximum, the circuit to red light 142 will remain closed during the period required for the vehicle to come to a stop and for a short period thereafter. Thus, even though the driver must of necessity pass through a range of speeds below the offending speed, the red light 142 will still remain illuminated for a short period. If the switch 162 has been opened, reclosure of this switch by the officer or other person investigating the recent driving conditions will cause light 142 again to be illuminated.

While I have shown the dashpot 144 as connected to arm 130, it may if desired control only switch blade 138. As shown, it delays the change in rotation of odometers 104 and 105 upon a change in speed. Since the lag is approximately the same when the speed is being advanced out of the desired range as when it is being retarded into the desired range, the error in the reading of the odometers will not be appreciable in the majority of cases. The arrangement shown has the advantage that the lights 141 and 142 always indicate which odometer is being advanced. As pointed out above, however, where this lag is not desired in the transfer between odometers 104 and 105, the dashpot can be associated with the switch blade 138 independently of lever 130 and the switch blade can be yieldably engaged by lever 130 to permit independent movement of the latter in either direction.

It will be seen that I have provided a speedometer and an odometer arrangement in which provision is made for, at all times, registering the number of miles travelled in various speed ranges. It will also be seen that my registering device provides for indicating the distances travelled within various speed ranges within the last predetermined number of miles travelled. At the same time, I have made provisian by means of lights for indicating, even after the vehicle has been stopped, the speed range within which the vehicle was last driven for any appreciable time. It will further be seen that the device which I have described, provides a means for checking upon the driving history of a vehicle both over a long period of time and over a relatively short period of time.

It is to be understood that the apparatus employed is shown in somewhat schematic form for purposes of simplicity in illustration. The invention is in no way limited to this particular apparatus. For example, the various odometers may be mechanically controlled, if desired. In general, the invention is to be limited only by the scope of the appended claims.

I claim as my invention:

1. In combination, speed indicating means, a plurality of odometers, one for each of a plurality of speed ranges, driving means comprising a device responsive to the movement of a vehicle to drive said speed indicating means and said odometers, means for selectively reversing the relative direction in which each one of said odometers is driven with respect to the other, and means including mechanism associated with said speed indicating means for controlling said reversing means to cause said driving means to advance the odometer corresponding to the speed range indicated by the speed indicating means and to retract the odometer corresponding to another speed range so that the odometers collectively indicate a constant total predetermined distance.

2. In combination, speed indicating means, a plurality of odometers, one for each of a plurality of speed ranges, driving means comprising a device responsive to the movement of a vehicle to drive said speed indicating means and said odometers, means for selectively reversing the relative direction in which each one of said odometers is driven with respect to the other, means including mechanism associated with said speed indicating means for controlling said reversing means to cause said driving means to advance the odometer corresponding to the speed range indicated by the speed indicating means and to retract the odometer corresponding to another speed range so that the odometers collectively indicate a constant total predetermined distance, and means associated with said odometers to indicate the one last advanced.

3. In combination, mechanism responsive to the movement of a vehicle, a plurality of distance registering devices, one for each of a plurality of ranges of speed of a vehicle, means comprising a device responsive to the speed of movement of the vehicle and operative selectively to cause said movement responsive mechanism to advance the distance registering device corresponding to the existing speed range of the vehicle, said last named means also comprising a disengageable driving connection between said movement responsive mechanism and said last named distance registering device for driving it in said advancing direction, and a reversely operating disengageable driving connection between said movement responsive mechanism and another of said distance measuring devices, said driving connections being interconnected so that when said first named connection is engaged to advance the first named distance registering device, said further reversely operating driving connection is engaged to retract the other distance registering device whereby said distance registering devices collectively indicate a constant total predetermined mileage.

4. In combination, mechanism responsive to the movement of a vehicle; a plurality of distance registering devices, one for each of a plurality of ranges of speed of a vehicle; disengageable, driving connections between said movement responsive mechanism and each of said distance registering devices for selectively advancing said devices; means including a device responsive to the speed of the vehicle for causing engagement of the connection between said movement responsive mechanism and that one of said distance registering devices corresponding to the existing speed of the vehicle; a plurality of electrically operated signal devices, one for each of said speed ranges; means to selectively energize one or another of said signal devices corresponding to the speed range in which the vehicle is being driven; and means including a device initially operated in connection with the engagement of the driving connection to the indicating device for maintaining said corresponding signal device energized after the vehicle ceases to be driven in that speed range.

5. In combination, mechanism responsive to the movement of a vehicle, a plurality of distance registering devices, one for each of a plurality of ranges of speed of a vehicle, means including a device adapted to respond to the speed of movement of the vehicle operative selectively to cause said movement responsive mechanism to advance the distance registering device corresponding to the speed of the vehicle, two color luminous signal means associated with said distance registering devices for simultaneously producing signals of different color adjacent to different ones of said registering devices, a device movable between a plurality of positions corresponding to the ranges of speed of the vehicle for simultaneously changing the color of the signals adjacent said different devices, and means operatively connected with said speed responsive means for positioning said movable device so as to cause said signal means to signal with light of one color adjacent the distance registering device corresponding to the speed range within which the vehicle was last driven and to signal with the light of the other color adjacent the distance registering device corresponding to the speed range within which the vehicle was driven prior to entering the previously named speed range.

FREDERICK O. LINGENFELDER.

REFERENCES CITED

The following references are of record in the file of this patent:

UNITED STATES PATENTS

| Number | Name | Date |
|---|---|---|
| 787,969 | Yoder | Apr. 25, 1905 |
| 1,195,930 | Shipman | Aug. 22, 1916 |
| 1,686,623 | Malherbe | Oct. 9, 1928 |
| 2,159,915 | Wagenen | May 23, 1939 |
| 2,193,388 | Blue | Mar. 12, 1940 |
| 2,334,523 | Welch | Nov. 16, 1943 |

FOREIGN PATENTS

| Number | Country | Date |
|---|---|---|
| 300,150 | Great Britain | Nov. 5, 1928 |
| 657,484 | Germany | May 5, 1938 |